US006993500B2

(12) United States Patent
Ishihara

(10) Patent No.: US 6,993,500 B2
(45) Date of Patent: Jan. 31, 2006

(54) SYSTEM AND METHOD FOR ELECTRONIC BUSINESS TRANSACTION OF TRADING CARDS

(75) Inventor: Tsunekazu Ishihara, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 840 days.

(21) Appl. No.: 10/105,809

(22) Filed: Mar. 21, 2002

(65) Prior Publication Data
US 2002/0165794 A1 Nov. 7, 2002

(30) Foreign Application Priority Data
Mar. 26, 2001 (JP) ............................. 2001-086617

(51) Int. Cl.
*G06F 17/60* (2006.01)
(52) U.S. Cl. ........................ 705/27; 705/26; 705/28; 705/29; 463/22
(58) Field of Classification Search .................. 705/27, 705/26, 28, 29; 463/1, 11, 22
See application file for complete search history.

(56) References Cited

U.S. PATENT DOCUMENTS

| 5,533,124 A | * | 7/1996 | Smith et al. | ................... | 705/57 |
| 5,689,561 A | * | 11/1997 | Pace | ......................... | 705/55 |
| 6,200,216 B1 | * | 3/2001 | Peppel | ........................... | 463/1 |
| 6,612,501 B1 | * | 9/2003 | Woll et al. | .................. | 235/494 |
| 6,735,324 B1 | * | 5/2004 | McKinley et al. | .......... | 382/100 |
| 2002/0042744 A1 | * | 4/2002 | Kohl | ........................... | 705/14 |
| 2002/0043764 A1 | * | 4/2002 | Imhof | ........................ | 273/292 |

FOREIGN PATENT DOCUMENTS

JP          2001331667 A  * 11/2001

OTHER PUBLICATIONS

Xippix Inks Deal with Amazon.com; ImagePump Technology and Hosting Will be Available to Selected Sellers, Business Wire, p 0951, Jun. 6, 2000.*

* cited by examiner

*Primary Examiner*—James S. McClellan
(74) *Attorney, Agent, or Firm*—Nixon & Vanderhye P.C.

(57) ABSTRACT

An electronic business transaction system of a trading card typically uses the Internet. That is, when a site for the electronic business transaction of the trading card is accessed over the Internet from a user terminal, a server makes the user terminal display a card pack selecting screen. When a user selects a card pack on the screen, the server makes the user input personal information of the user and a payment method through the user terminal. Thereafter, the server makes the user terminal display a contents confirmation screen so as to make the user select a card pack that the user wants to confirm the contents. When the user selects the card pack that the user wants to confirm the contents by operating the user terminal, the server makes the user terminal display at least a part of illustrations (contents) of cards enclosed in the card pack that the user determines to purchase.

24 Claims, 11 Drawing Sheets

FIG. 4  TRADING CARD DATABASE STORAGE 14

| EXTENSION PACK No. | KIND NUMBER | ENCLOSED CARD NUMBER | | |
|---|---|---|---|---|
| No. 1 (PIKACHU) | 100 | 005, 007, 019, · · · , 088 | | |
| | 101 | 012, 051, 102, · · · , 177 | | |
| | ⋮ | ⋮ | | |
| | 199 | 007, 012, 131, · · · , 182 | | |
| No. 2 (MEW) | 200 | · · · | | |
| | 201 | · · · | | |
| | ⋮ | ⋮ | | |
| | 299 | · · · | | |
| No. 3 (TOGEPI) | 300 | · · · | | |
| | 301 | · · · | | |
| | ⋮ | ⋮ | | |
| | 399 | · · · | | |
| CARD NUMBER | CHARACTER NAME | IMAGE DATA | PROBABILITY OF APPEARANCE | RARENESS |
| 001 | FUSHIGIBANA | G1 | ○× % | ★ |
| 002 | HITOKAGE | G2 | △□ % | ● |
| 003 | ZENIGAME | G3 | △△ % | ◆ |
| ⋮ | ⋮ | ⋮ | ⋮ | ⋮ |
| 100 | | G100 | ×○ % | ● |
| ⋮ | ⋮ | ⋮ | ⋮ | ⋮ |
| n−1 | | Gn−1 | ○○ % | ● |
| n | MEW | Gn | △△ % | ★★★ |

14a (extension pack table)
14b (card table)

CARD DETERMINATION DATA STORAGE (CARDS DATA, RANDOM NUMBER DATA AND ETC. EVERY RARENESS IN ONE SET)

ORDER DATA STORAGE 15

| RECEPTION NUMBER | DATE IN | USER NAME | ADDRESS | EXTENSION PACK No. | PACK KIND | CARD NUMBER | SHIPPING DATE |
|---|---|---|---|---|---|---|---|
| RECEPTION 001 | ○MONTH×DATE | A | ○○PREFECTURE△ CITY・・ | No. 1 | 101 | 012, 05 1,・・・ | ○MONTH△DATE |
| RECEPTION 002 | ○MONTH□DATE | B | ○×PREFECTURE□ CITY・・ | No. 2 | 212 | ・・ ・・ | ○MONTH○DATE |
| ・・・・・・・ | ・・・・・・・ | ・・・・・・・ | ・・・・・・・ | ・・・・・・・ | ・・・・・・・ | ・・・・・・・ | ・・・・・・・ |

ESTIMATE AND ADDRESS SCREEN

ESTIMATED AMOUNT

| EXTENSION PACK No.1 | ONE | ¥ 3 0 0 - |
|---|---|---|
| SHIPPING CHARGE | — | ¥ 1 0 0 - |
| CONSUMPTION TAX | | ¥ 2 0 - |
| TOTAL | | ¥ 4 2 0 - |

ADDRESS TO BE DELIVERED AND ETC.

NAME  ○△ ××     MAIL ADDRESS  ○×@×××

ADDRESS  ×××·····

[ O K ]    [ CANCEL ]

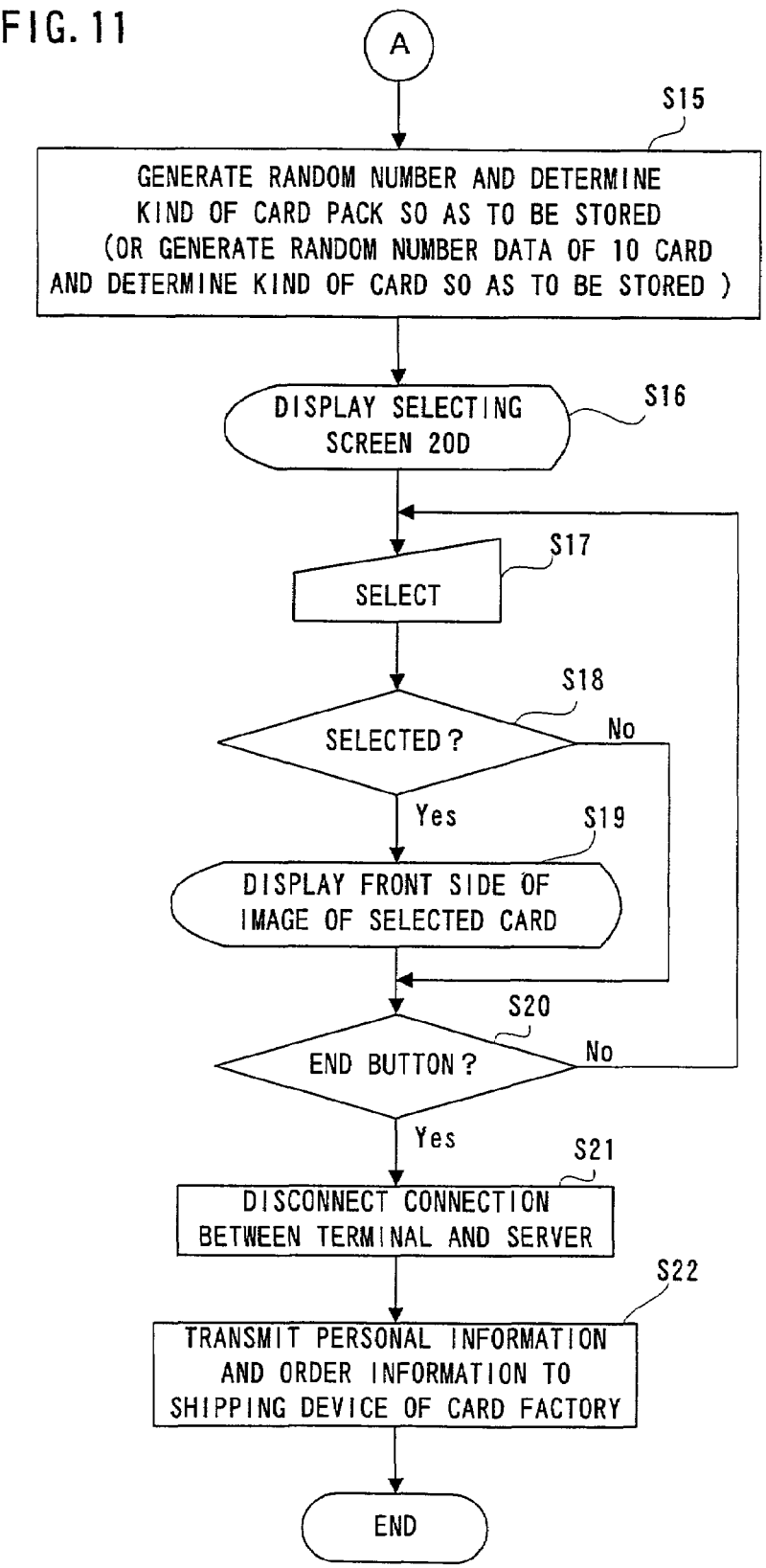

SYSTEM AND METHOD FOR ELECTRONIC BUSINESS TRANSACTION OF TRADING CARDS

BACKGROUND OF THE INVENTION

1. Field of the Invention

The present invention relates to a system and a method for an electronic business transaction of a trading card. More specifically, the present invention relates to an electronic business transaction system and a method thereof for selling, by an electronic business transaction utilizing a computer, a card pack in which a plurality of kinds of trading cards are substantially randomly selected by a predetermined number and packed.

2. Description of the Prior Art

Conventionally, a card pack in which a predetermined number of trading cards are packed is sold over the counter. A combination of cards within a card pack includes plural kinds of cards, and a card having rarity value is mixed at a certain probability within each card pack. Therefore, a purchaser (user) selects a card pack to be purchased, pays for the card pack at a register, opens the card pack as soon as the user goes out of the store before going home and looks forward to checking the kind of the cards enclosed therein. That is, the user has a strong emotion to check the contents as soon as possible at a time of purchasing the card pack and determine whether or not the card they don't have can be obtained.

On the other hand, with growing rate of Internet access around the world, utilization of an electronic business transaction or electronic commerce is increasing, in which various kinds of items are selectively purchased through the Internet, and the items are sent to a purchaser's home by mail, parcel delivery service or the like after electronic account settlement. It is probable that the trading card is sold utilizing the electronic business transaction.

However, in a case of purchasing the trading card by the electronic business transaction, the user cannot know the contents until the purchased card pack is delivered to his or her house. Therefore, many of the users tend to utilize a conventional counter selling and thus, in an aspect of sales of the trading card, there is a problem with successfully promoting the utilization of the electronic business transaction.

One approach to solving this problem, at a time of the electronic business transaction, is to permit the contents to be freely viewed beforehand on the web site similar to sales of other items. However, applying this method to the sales of the trading card causes the following disadvantage. That is, the more kinds of trading cards which the user already has (undesired cards for the user) increases the probability of the user canceling the purchase, increases connect time and causes electronic business transaction process troubles.

Furthermore, if the combination of the kinds of the enclosed trading cards is increased in number, there may occur situations where there is a difference between the confirmed or checked contents and delivered contents. If a card pack having the same contents with that confirmed by the user is not delivered, user's expectations are not met, thereby discrediting the electronic business transaction all the more.

SUMMARY OF THE INVENTION

Therefore, it is a primary object of the present invention to provide a novel electronic business transaction system and method thereof suitable for selling a trading card.

Another object of the present invention is to provide an electronic business transaction system of a trading card and a method thereof capable of promoting utilization by a user allowing the user to soon confirm or check contents of a card pack.

A further object of the present invention is to provide an electronic business transaction system of a trading card and a method thereof capable of preventing cancellation of purchase after confirming the contents of the card pack and smoothly performing an electric business transaction of the trading card.

Another object of the present invention is to provide an electronic business transaction system of a trading card and a method thereof capable of surely delivering the card pack that the user has confirmed the contents in the electronic business transaction of the trading card.

An electronic business transaction system according to the illustrative embodiments is a system for selling, by an electronic business transaction utilizing a computer, a card pack in which a plurality of kinds of trading cards are randomly selected and enclosed by a predetermined number and comprises: a purchase determination screen display means (describing a parallelism between the embodiment, a program, a CPU21 and a display portion 25 for displaying a screen 20A in FIG. 6); a personal information input means (a program, the CPU 21, the display portion 25 and the keyboard 24 for displaying a screen 20B shown in FIG. 7); a payment method specifying means (a program the CPU 21, the display portion 25 and the keyboard 24 for displaying a screen 20C, shown in FIG. 8); a contents confirmation selecting means (a program, the CPU 21, the display portion 25, and keyboard 24 for displaying a screen shown in FIG. 9); and a contents display means (a program, the CPU21 and the display portion 25 for displaying a screen 20D shown in FIG. 9,). Herein, the card pack is sold with a seal so that the contents of the trading cards cannot be viewed from outside and are multiple in kinds depending on a combination of the kind of the enclosed trading cards.

The purchase determination screen display means displays the screen (20A) for selecting purchase of the card pack so as to allow a user to make a decision to purchase the card pack. The personal information input means displays the screen (20B) for specifying personal information of the user so as to allow the user to input the personal information. The payment method specifying means displays the screen (20C) for specifying a method for paying a price by the user specified by the personal information input means so as to allow the user to specify the payment method. The contents confirmation selecting means displays the screen (20D) for confirming the contents of the card pack so as to allow the user to select the confirmation of the contents after the personal information is input by the personal information input means and the payment method of the cost or price is specified by the payment method specifying screen display means. The contents display means displays on the same display screen (20D) the contents of at least a part of kind of the trading cards (or illustrations of the contents) enclosed in the card pack purchased by the user when confirmation of the contents of the card pack is selected.

An electronic business transaction method according to the illustrative embodiments is a method for selling, by an electronic business transaction utilizing a computer, a card pack in which a plurality of kinds of trading cards are randomly selected and enclosed by a predetermined number, and includes the following steps of: a first step for displaying a purchase determination screen; a second step for displaying personal information; a third step for specifying a payment method; a fourth step for selecting confirmation of contents; and a fifth step for displaying the contents. Herein, the card pack is sold with a seal so that the contents of the trading cards cannot be viewed from outside, and are multiple in kinds depending on a combination of the kind of the enclosed trading cards.

In the first step, a screen (20A) for selecting purchase of the card pack is displayed so as to allow the user to make a decision to buy the card pack. In the second step, a screen (20B) for specifying the personal information of the user is displayed so as to allow the user to input the personal information. In the third step, a screen (20C) for specifying a payment method by the user who is specified by the personal information input means is displayed so as to allow the user to specify the payment method. In the fourth step, a screen (20D) for confirming the contents of the card pack is displayed so as to allow the user to select to confirm the contents after the personal information is input by the personal information input means and the payment method is specified by the payment method specifying screen display means. In the fifth step, the contents of at least a part of kind of the trading cards enclosed in the card pack purchased by the user is displayed on the same screen (20D) when the confirmation of the contents of the card pack is selected.

Thus, according to the illustrative embodiments, since by displaying the screens to make a determination to purchase the trading cards, to make the personal information be input, to make the payment method be specified, to make the contents of the card pack be selected, and displaying the contents (kind) or figures of the selected cards, the kind or the figure of the card is known to the user at a time the trading card is determined to be purchased by the electronic business transaction before arrival of the item, the user can soon confirm the contents of the card pack (the kind or figure of the card), a desire to soon know the contents by the user can be realized, and therefore, sales of the trading card utilizing the electronic business transaction can be promoted by the user. Furthermore, according to the present invention, it is possible to prevent cancellation of purchase after confirming the contents of the card pack, and therefore, it is possible to smoothly perform the electronic business transaction of the trading card.

In another aspect of the illustrative embodiments, an electronic business transaction system for selling, on a web page opened on a server, a card pack in which a plurality of kinds of trading cards are randomly selected and enclosed in a pack by a predetermined number, and comprises: a server (10) including a host computer (CPU 11), a user terminal (a terminal device 20) including a terminal computer (CPU 21) selectively connected to the server, and a connecting line (Internet 30) connecting the server and at least one user terminal. The card pack is sold with a seal so that the contents of the trading cards cannot be viewed from outside, and are multiple in kinds depending on a combination of the kind of the enclosed trading cards.

In the system, the host computer transmits/receives data required for purchase of the card pack by the user between the user terminal when the user terminal is connected. Furthermore, the user terminal displays the purchase selecting screen (20A) for allowing the user to select purchase of the card pack when connected to the host computer, and transmits purchase determination data to the server when determination to purchase the card pack is made. In addition, the user terminal displays the screen (20B) for specifying personal information so as to allow the user to specify the personal information, and transmits individual specifying information (personal information) to the server when the individual specifying information is input. Then, the user terminal displays the screen (20C) to allow the user to specify the payment method of the cost or price of the card pack, and transmits the payment method data to the server when the payment method is specified. The user terminal displays the screen (20D) for confirming the contents of the card pack so as to select confirmation of the contents after inputting the individual specifying information and specifying the payment method of the cost. Furthermore, the user terminal displays at least the contents of a part of kind of the trading cards enclosed in the purchased card pack when the confirmation of the contents of the cad pack is selected. Then, the host computer processes data required for an electronic business transaction transmitted from the terminal computer so as to perform electronic account settlement.

In addition, according to a preferred embodiment, since information of a card pack that the user determines to purchases is stored in an order data storage provided with relation to the server, and the card pack information can be known to the card factory by accessing the storage, and therefore, the card pack enclosed with the cards that the user has confirmed the contents can be surely delivered to the user.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an illustrative view showing one example of a storage area of a trading card database storage on a server in this embodiment;

FIG. 5 is an illustrative view showing one example of a storage area of an order data storage of the server in this embodiment;

FIG. 7 is an illustrative view showing one example of a personal information input screen in purchasing;

FIG. 11 is a flowchart showing another part of the operation (card selection and display of the contents) of this embodiment.

DETAILED DESCRIPTION OF THE PREFERRED EMBODIMENTS

Figure 1:
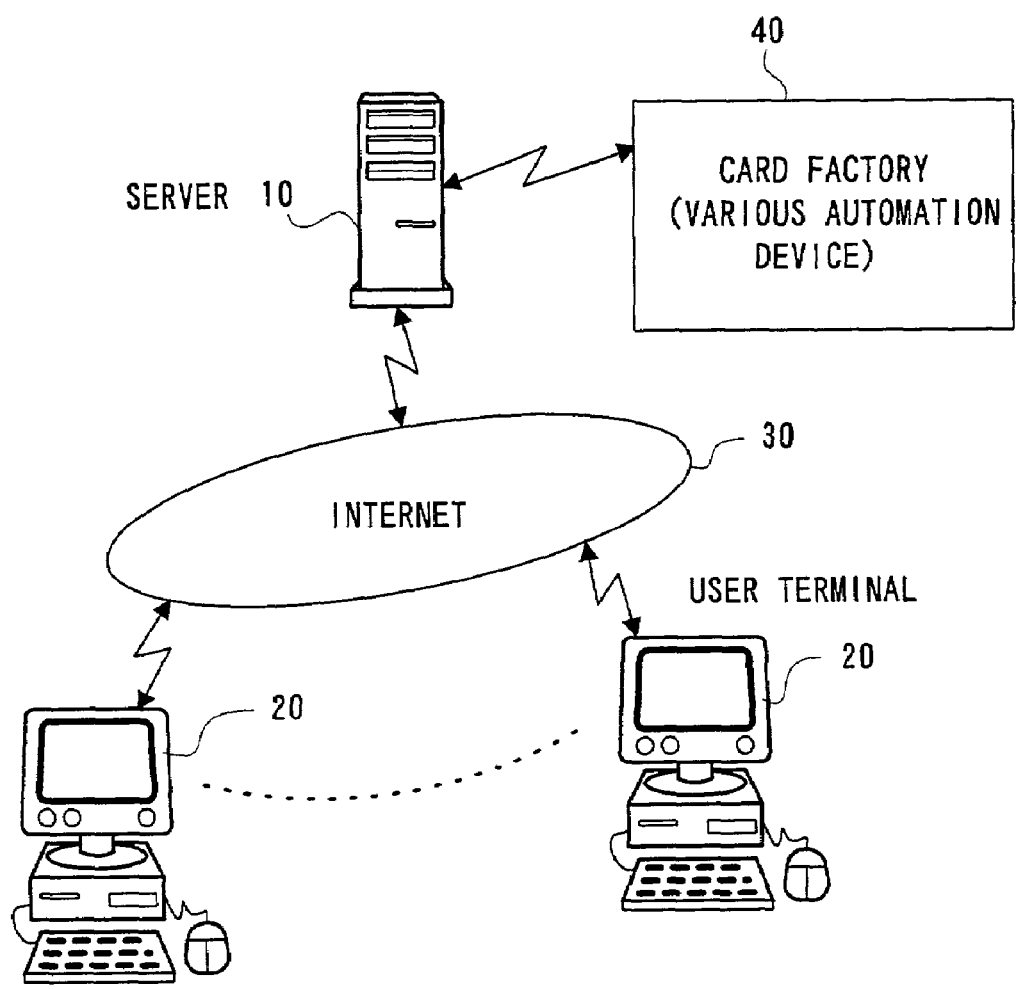
FIG. 1 is a schematic diagram showing an electronic business transaction system to which the present invention is applicable.

FIG. 1 is a schematic view showing a configuration of an electronic business transaction system to which the present invention is applicable. Referring to FIG. 1, a host server (hereinafter, may be referred to as "server") 10 is selectively connected with a plurality of user terminals (or terminal devices) 20 via an Internet connection (hereinafter, may be referred to as "Internet") 30. The user terminal 20 is a terminal computer such as a personal computer and etc. and includes a computer main body, a keyboard, a display, a mouse, and etc. The computer main body incorporates a modem (communication processing portion) for transmitting or receiving data. The server 10 is connected with a computer or an automation device of a card factory 40.

In a case the user purchases a card pack including trading cards by an electronic business transaction, the user specifies a home page address of the server 10 by operating the user terminal 20 to accesse the server 10. The server 10 transmits to the user terminal 20 menu screen data for displaying a menu of sales of items (e.g., see FIG. 6 described later) through the Internet 30 so as to be displayed on a display of the user terminal 20. The user selects items such as trading cards and etc. by viewing an indication on the display. The server 10 transmits to the user terminal 20 personal information input screen data (see FIG. 7 described later) and payment method input screen data (see FIG. 8 described later) so as to be displayed on its display. The user places an order for items to be purchased utilizing the electronic business transaction by inputting personal information (individual specifying information) such as a delivery address, and etc. and information required for settlement such as a payment method and etc. on the screen. These variety of data related to the electronic business transaction is transmitted to the server 10 through the Internet 30.

Then, after completion of ordering processes such as selection of the items, an input of the personal information, an input of the payment method and etc. by the electronic business transaction, the server 10, when the purchased item is a card pack enclosing trading cards, transmits to the user terminal 20 contents confirming screen data (see FIG. 9 described later) so that the user can input whether or not he or she desires to view a part or all of the contents of the card pack so as to be displayed on the display. When the user selects to view the contents, the data is transmitted to the server 10. The server 10 determines the contents of the card pack on the basis of random number data, and transmits to the user terminal 20 illustration data including a character, a letter, and symbol of at least a part of cards among a plurality of cards or all cards if possible included in the card pack which the user makes a decision to purchase so as to be displayed on the display.

Thus, the user can know the contents of the purchased card pack (kinds and illustrations of the trading cards included in the card pack) at a time of purchasing by the electronic business transaction before arrival of the item, and if a rare card which one does not have is included, the user will looking forward to receiving it. It is note that after knowing the contents, since the settlement of the electronic business transaction has completed, it is impossible to cancel the purchase.

Figure 2:
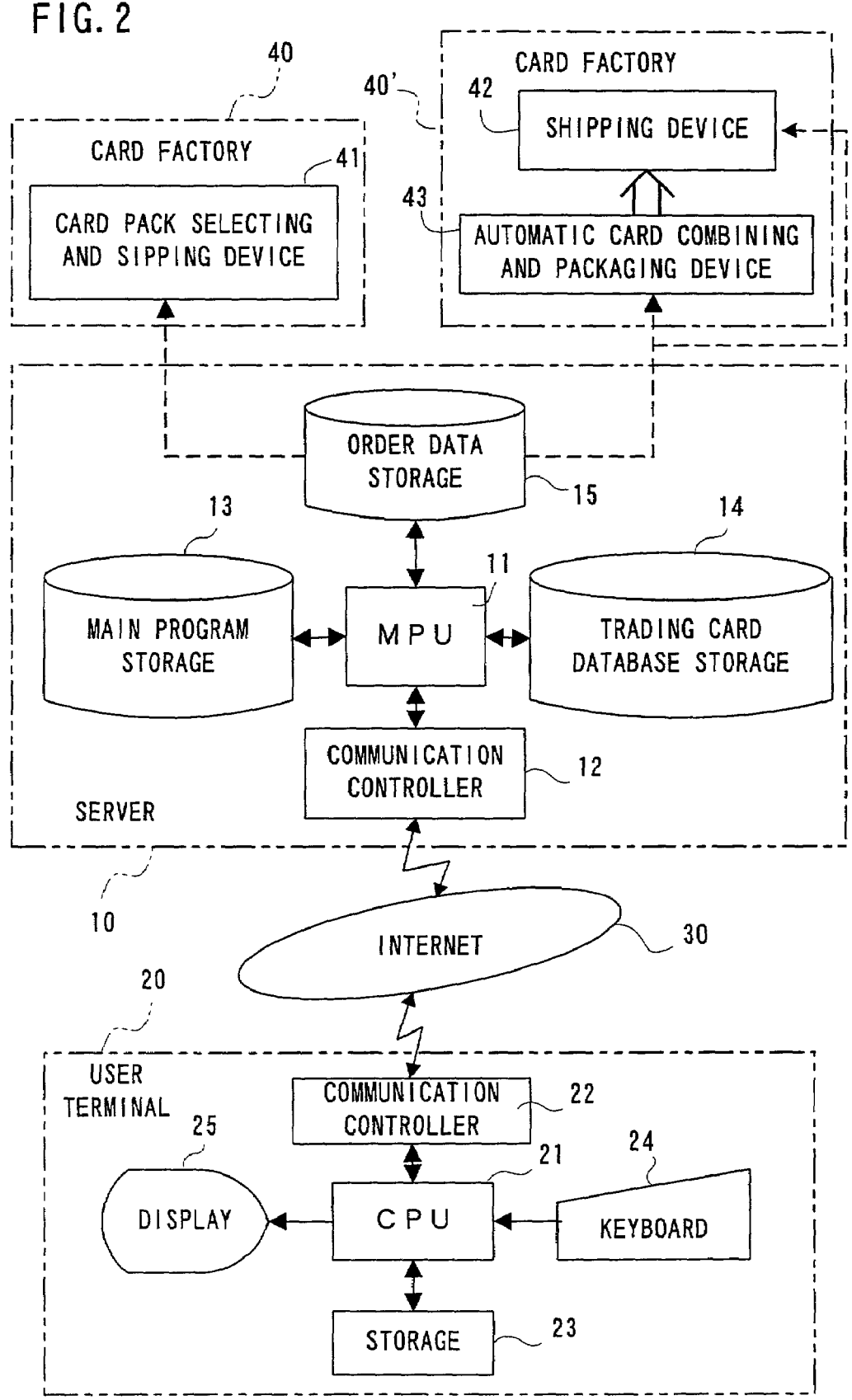
FIG. 2 is a block diagram showing the electronic business transaction system of a trading card of this embodiment according to the present invention.

On the other hand, the server 10 transmits to a variety of automation devices of the card factory 40 (e.g., a shipping processing device and/or a card automatic combining and packaging device and etc. shown in FIG. 2) customer information (personal information) of the user and information related to the selected or purchased card pack (kind data of the card pack or kind data of a predetermined number of the trading cards). The shipping processing device prints an address of the user on an envelope on the basis of the customer information or personal information, encloses the card pack including the trading cards the same as the user viewed, and then, seals it, the card pack being subjected to the shipping processing.

FIG. 2 is a block diagram showing details of one embodiment of the electronic business transaction system of the trading card of the present invention and a method thereof.

Referring to FIG. 2, the electronic business transaction system of the trading card (or a computer system for realizing the electronic business transaction method of the trading card) includes the server 10. The server 10 includes a host computer or a MPU 11 as a controller, and is connected to the Internet 30 via a communication controller (or modem) 12. The MPU 11 is connected with a main program storage 13, a trading card database storage 14 and an order data storage 15. These storages 13, 14 and 15 are constructed by a hard disk, a RAM, a flash memory, or these combinations.

The storage 13 is for storing a main program for the electronic business transaction of the trading card and etc., and specifically stores data of the menu screens of sales of items shown in FIG. 6 described later, program data for displaying the screens of the electronic business transaction shown in FIG. 7 to FIG. 9, a program for realizing operation of the server 10 in flowcharts shown in FIG. 10 and FIG. 11, and etc.

The storage 14 is for storing illustrations of the trading cards and a variety of information related to the cards, and stores a table shown in FIG. 4 described later, image data of an illustration of each card shown in FIG. 9, and etc.

The storage 15 is for storing order data by the electronic business transaction, and stores customer information, items data selected to be purchased, kind data of a predetermined number of cards for specifying the contents of the card pack, kind data of the card pack or the like on an order-by-order basis, as shown in FIG. 5, for example.

Herein, a relation between the kind of the card pack and the trading cards enclosed in the card pack will be described. First, the trading cards enclosed in the card pack will be described.

Figure 3:
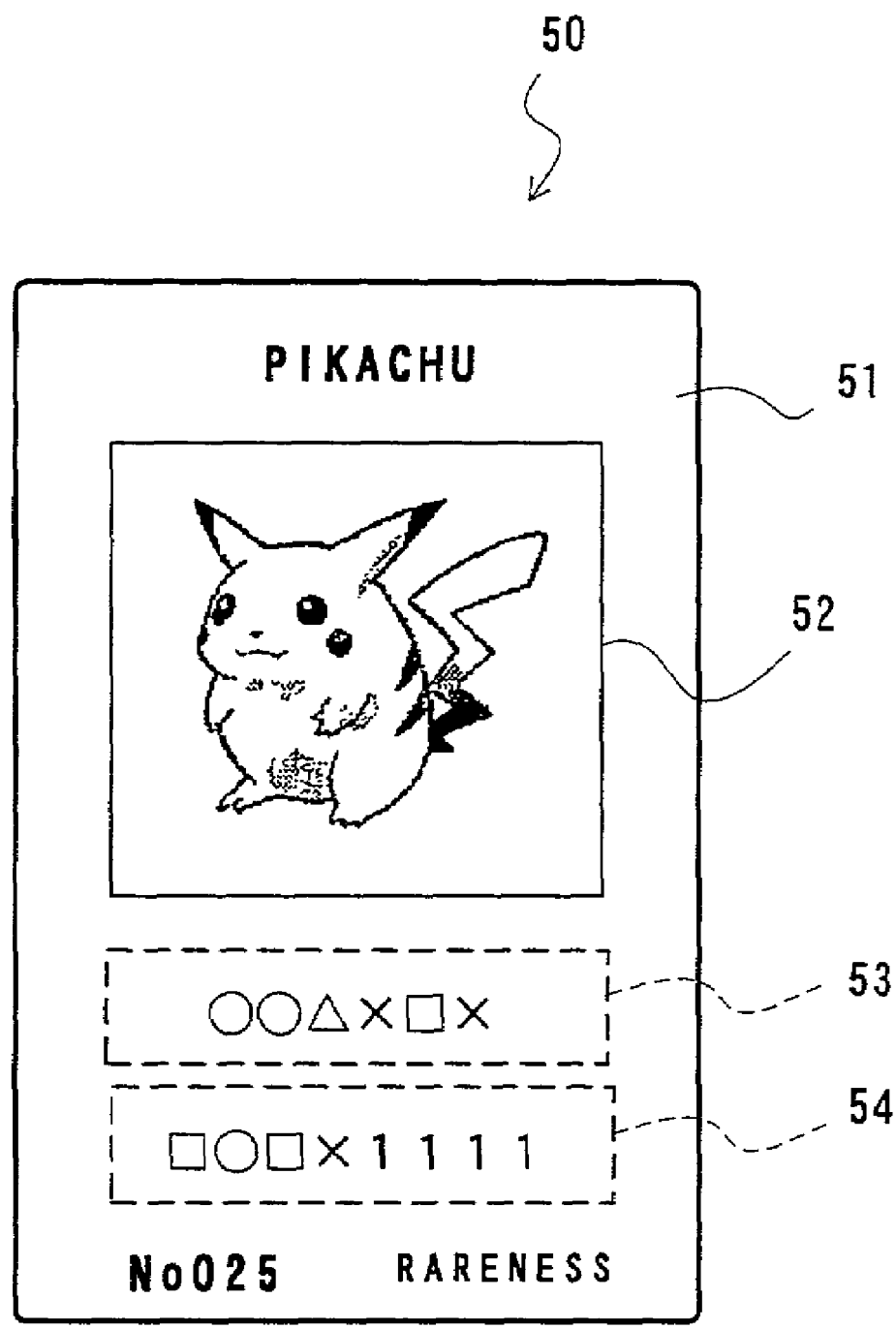
FIG. 3 is an illustrative view showing one example of the trading card sold in this embodiment.

FIG. 3 is an illustrative view showing a game card which is one example of the trading card sold by the electronic business transaction system or the method of the present invention. A trading card (or game card) 50 is formed with, on one main surface 51 of the card, an illustration indicating area 52, an ability data recording area 53, and an attribute data recording area 54. Where the trading card 50 is in a vertically-long rectangular, for example, the illustration indicating area 52 is formed in a most conspicuous upper region (upper half) or in a region somewhat broader than the upper half, to depict therein various characters such as animals, humans, imaginary monsters or the like by printing. The character depicted in the illustration indicating area 52 is a character different in kind, design, or figure on a card-by-card basis in order to represent a feature of the card. The character includes a character that will appear on a game screen upon executing the game program of a game soft ware (not shown), for example (such as hero character, ally, enemy characters or to-be-collected characters, or the like).

As a sales method of the trading card, it is preferred to put on sale a combination of a multiplicity of cards (e.g., 30 to 40 cards) (called "Starter Kit") so that such rare or pretty characters as to be collected by a collector can be included at a certain probability, and there would be cases of set sale on a reduced-number-of-cards basis (e.g., 10 cards) (called "Expansion Pack"). Then, rare kinds of trading cards having rarity value are preferably included in the trading cards 50 enclosed in the expansion pack at a certain probability. So as to notify a degree of rarity value (hereinafter, may be referred to as "rareness"), a rareness mark (e.g., star mark) is given to any area of the trading card 50. The rareness sets in a plurality of levels (e.g., 3 to 5 levels), and the more the number of the star marks, the higher the rareness of the card.

Furthermore, the ability data recording area 53 is an area for indicating in letters, symbols, numerals or their combinations ability data (may be referred to as attribute data) of a character being depicted in the illustration indicating area 52. For example, data including a character name, a character number, letters or symbols which represent weapons or magic to be used by the character, physical strength, power, hit point, offensive power, defensive power, and etc. together with the numerals representative of their amounts, and other kinds of data are visually (visually recognizably) printed. The attribute data recording area 54 is an area for indicating ability data or individuality representing data of the character depicted in the illustration indicating area 52.

More specifically, where the trading card is concerned in contents with an imaginary monster capturing and raising game in an electronic game or a video game, the character to be depicted in the illustration indicating area 52 may be a monster, wherein the individuality representing data or ability data to be recorded in the attribute data recording area 54 may be trick or performance data on a monster-by-monster basis, evolution-related data, explanatory texts of words, texts and etc. to explain the feature of the monster (letter or text data) and so on.

Furthermore, where the trading card is a card concerned in sports such as baseball, soccer or the like, the character (illustration) may be an athlete picture and the attribute data may be pictured-athlete's team name, the player's number, age and record data (in baseball, for a batter a batting ave., a home-run count, r.b.i, stolen bases, running power and etc., and for a pitcher an earned run ave., strike-outs, a self-approach point and etc., and for soccer, physical ability, a goal point, an assist count and etc.).

Where the trading card is a game card concerned in a role-playing game or an action game of the video game, the character may be a game-appearing person, an animal, or an imaginary animal or plant while the individuality representing data is appearing-person's life, power, ability, available items (weapons, guard, magic) and so on.

It is noted that in a case the card is aimed not for enjoying a card game utilizing a multiplicity of cards (not the game card), but for only collecting, it is enough to provide the character depicted on the illustration indicating area 52, and the attribute data recording area 54 may be omitted.

Then, a relation between the kind of the card pack and the trading card will be described. The relation between the kind of the card pack and the trading card is determinable utilizing two combination methods.

A first combination method is that in a case the card pack is the expansion pack which including 10 sheets of cards per one pack, each card pack is fixedly determined in a mnner that the combination of the kind of cards becomes a predetermined number (e.g. the combinations of cards are 100 kinds determined in advance) every pack. According to this first combination method, since the kinds of the combinations are not so large, and that the kinds of the combinations can be hold to some extent, there is a need for a user to purchase at least 100 sets of the card packs in order to collect all kinds of cards, and therefore, there is an advantage that a buying inclination of the user is driven.

Thus, plurality kinds of trading cards or game cards are randomly selected by a predetermined number so as to be enclosed in the card pack. The card pack is sold with a seal so that the contents of the trading card or the game card cannot be viewed from outside, and is provided in multiple kinds depending on a combination of the kind of the enclosed cards. It is noted that a design of an exterior and an informative label of the card pack is selected so that the kind of the card enclosed cannot be discriminated from outside by the user.

Referring to FIG. 2 again, each of user terminals 20 includes a CPU (controller) 21, a communication controller (or modem) 22, a storage 23, an input portion 24 such as a keyboard and etc. and a display portion (display) 25. The communication controller 22 is connected to the Internet 30 via a public circuit (or CATV) and a provider (not shown).

In the case of the first combination method described above, the order data storage 15 is made accessable from the automation device including a computer of the card factory 40. The card factory 40 includes the card pack selecting and shipping device 41, for example. The card pack selecting and shipping device 41 is for automatically selecting any one of the combinations of the kinds of the cards determined in advance per a card pack. The card pack selecting and shipping device 41 has a function of printing a name and an address of a customer or user on an envelope on the basis of various data every customer stored in the order data storage 15 and enclosing the selected card pack in the envelope.

A second combination method is a method for selecting the cards by an arbitrary combination. The combination method is set with a probability of generation in advance for each kind of card, and in this method, the cards are ranked depending on rarity (rareness), and the kind of the card is set such that some cards different in level of the rarity (for example, in a case of classification into 3 levels of the rareness, high, middle, low) are combined at a fixed ratio in one card pack. Random number data according to the number of cards to be enclosed are generated, and selection is made in a manner that a card setting number for each rareness is determined on the basis of the random number data. Such the generation of the random number data for each rareness and determination of the kind of the card (card number) based on the random number data are processed by the computer (CPU and program) and etc. According to the second combination method, there are advantages that it is possible to select the combination of the trading cards enclosed in the one card pack in quite a various kinds, it is possible to drive the user's willingness to buy the trading cards, and therefore, sales promotion of the cards is performed. On the other hand, there are disadvantages that the kind becomes large, and manufacture and inventory control increase in complexity.

In the case of the second combination method, as shown in the card factory 40', a shipping device 42 and an automatic card combining and packaging device 43 are provided. The automatic card combining and packaging device 43 selects, on the basis of the card number data among various kinds of data every customer stored in the order data storage 15, a card of a corresponding number one by one from a shelf stocked with the cards every card number, selects a predetermined number of cards (e.g., 10 cards) and then, encloses the cards in a packaging bag and seals the bag. The card pack in which the cards is thus enclosed is put into by a shipping device 42 an envelope having the customer's name and address together with a voucher such as an invoice, a purchase specification and etc., and then, the envelope is sealed so as to be subject to shipping processing.

A more detailed embodiment will be described below.

FIG. 4 is an illustrative view showing a storage area (memory map) of the card database storage 14 of the server 10. The storage 14 includes at least storage areas 14a to 14c. The storage area 14a, in a case of the first combination method in which the enclosed cards are fixedly determined, stores expansion pack-specific kind specifying data to specify a card (card number) in correspondence to every expansion pack and every kind. For example, in a case the kinds of package designs of the expansion packs (visually identifiable kind) are three kinds of No. 1 to No. 3 as shown in FIG. 6 described later, each of which has a predetermined number in kinds (e.g., 100 kinds), all the card numbers (e.g., 10 cards) enclosed in the card pack are stored every expansion packs No. 1 to No. 3 and every kind number. In this case, the enclosed cards even if have the same expansion pack number No. 1 to No. 3, are different in combinations every kind number (for No. 1 the kind number is 100, 101, . . . 199, for No. 2 the kind number is 200, 201 . . . 299 and for No. 3 the kind number is 300, 301 . . . 399). However, from the appearance of the package, the user cannot discriminate or identify the combination of the kind of the enclosed cards. As the method, it is thinkable a method in which a specific barcode which can be read only mechanically is printed on the backside of the package, and a method in which the kind number is printed by utilizing visually unrecognizable magnetic ink, or the like, for example.

The storage area 14b is an area for storing character name data (Fushigibana, Hitokage, Zenigame . . . Mue and etc.) and image data of the illustration depicted in the illustration indicating area 52 (dot data G1, G2 . . . Gn) of each card every card number (001, 002 . . . n). The storage area 14b may be stored with a probability of appearance and the rareness every card number as necessary. Data of the probability of appearance and the rareness is utilized for displaying the probability of appearance and the rareness at a time the illustration and the name of the card that the contents of the card pack is viewed in a case of the first combination method, and utilized as data for realizing the combination of the cards according to the second combination method.

The storage area 14c is an area for storing a card determination program for determining the kind of the card pack or the cards enclosed in the expansion pack. For example, the storage area 14c is stored with data of the number of cards, the random number data and etc., every rareness within one set of the expansion pack. In a case the kind number of the expansion pack is determined according to the first combination method, after the user selects any one of the expansion packs No. 1 to No3, the card determination program is a program for selecting or determining any one of numbers of 0 to 99 based on the random number data.

Furthermore, in a case of determining the kind number of the expansion pack according to the second combination method, the card determination program generates the kind number by the number of the cards (e.g., 10 cards) enclosed in the card pack on the basis of the random number data so that the number of cards every rank of the rareness falls within a set number, and any number within the range of the maximum number of the kind of card becomes the probability of appearance. In a case the number of the cards for each rareness rank is different from the set number, or in a case the probability of appearance is different from the set value, or in a case the same card appears, generation processing of the random number data is repeated so that a card having the rareness of another rank, or a card suitable for the probability of appearance can be enclosed within one card pack or the same kind of card within one card pack is not included more than two sheets of cards.

FIG. 5 is an illustrative view showing a storage area of the order data storage 15 of the server 10. The storage 15 includes storage areas 15a to 15h every user or every reception. For example, in the case the determination method of the combination of the kind of cards is the first method, the storage areas 15a, 15b, 15c, 15d 15e, 15f and 15h are areas for storing a receipt number, a date or reception, a user name (customer name), an address, a expansion pack number (or purchased item name), kind data of the determined expansion pack, and a shipping date, respectively.

It is noted that in the case the determination method of the combination of the kind of cards is the second method, a storage area 15g for storing the card number is utilized in place of the storage area 15f of the kind data of the above-described expansion pack. The storage area 15g includes an area for storing the card number (data for specifying the kind of the enclosed cards) corresponding to the number enclosed in one set of the expansion pack. Furthermore, areas for storing a mail address of the user and storing the payment method may be provided as necessary, and in a case of payment by credit card, a credit number may be stored, and the settlement procedure such as payment on delivery and etc. and total amount may be stored.

Figure 6:
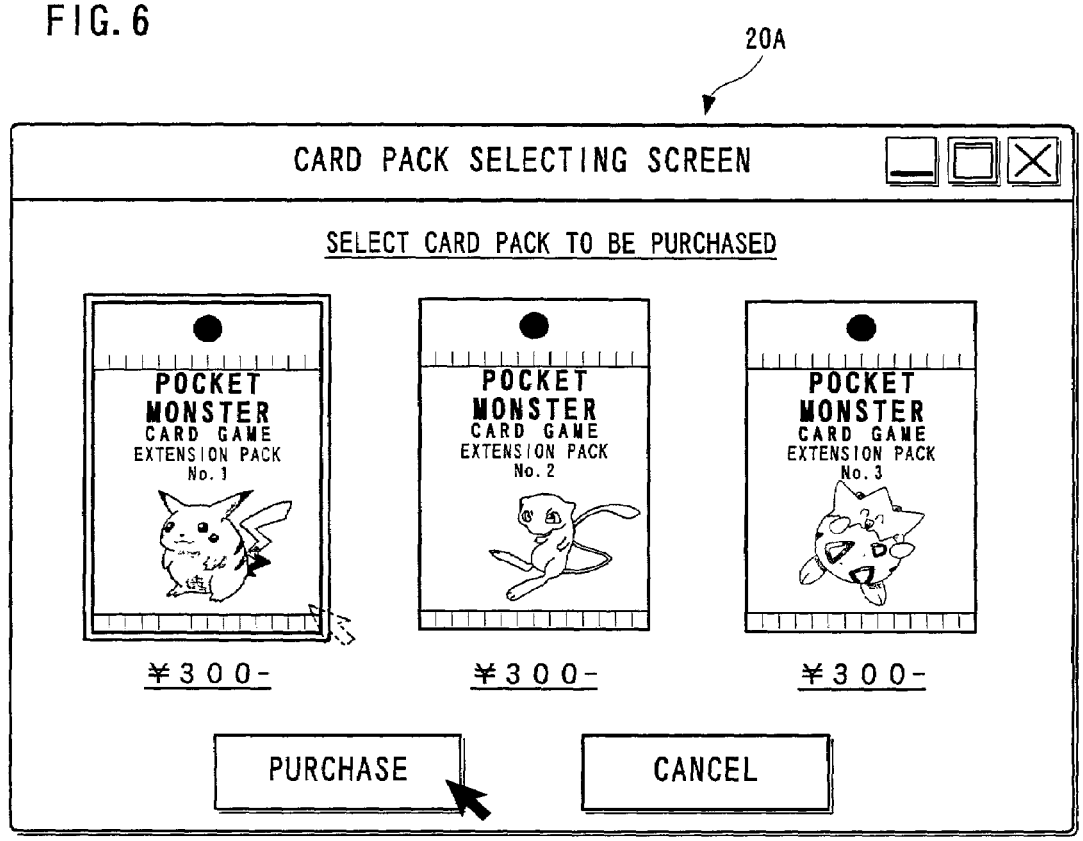
FIG. 6 is an illustrative view showing one example of a card pack selecting screen.

FIG. 6 is an illustrative view showing one example of a card pack selecting screen. In a case the user purchases the trading card 50 by the electronic business transaction, a card pack selecting screen 20A as shown in FIG. 6 is displayed. On the selecting screen 20A, illustrations of the packages of the expansion packs No. 1 to No. 3 are displayed so as to select the card pack that the user wants to purchase. Buttons or icons for determining any one of "purchase" and "cancel" are displayed below the illustration. In a case of purchasing the expansion pack, a desired illustration of the expansion pack from No. 1 to No. 3 is clicked and thereafter, the icon of "purchase" is clicked or turned on. In a case of purchasing a plurality of expansion packs, the operation is repeated.

FIG. 7 is an illustrative view showing one example of an estimated amount display and a personal information input screen at a time of purchasing. After the user selects the desired card pack according to the method shown in FIG. 6, a personal information input screen 20B shown in FIG. 7 is displayed. On the screen 20B, the user confirms the item to be purchased and a cost thereof, inputs one's name and a delivery address, and inputs a mail address as necessary.

Figure 8:
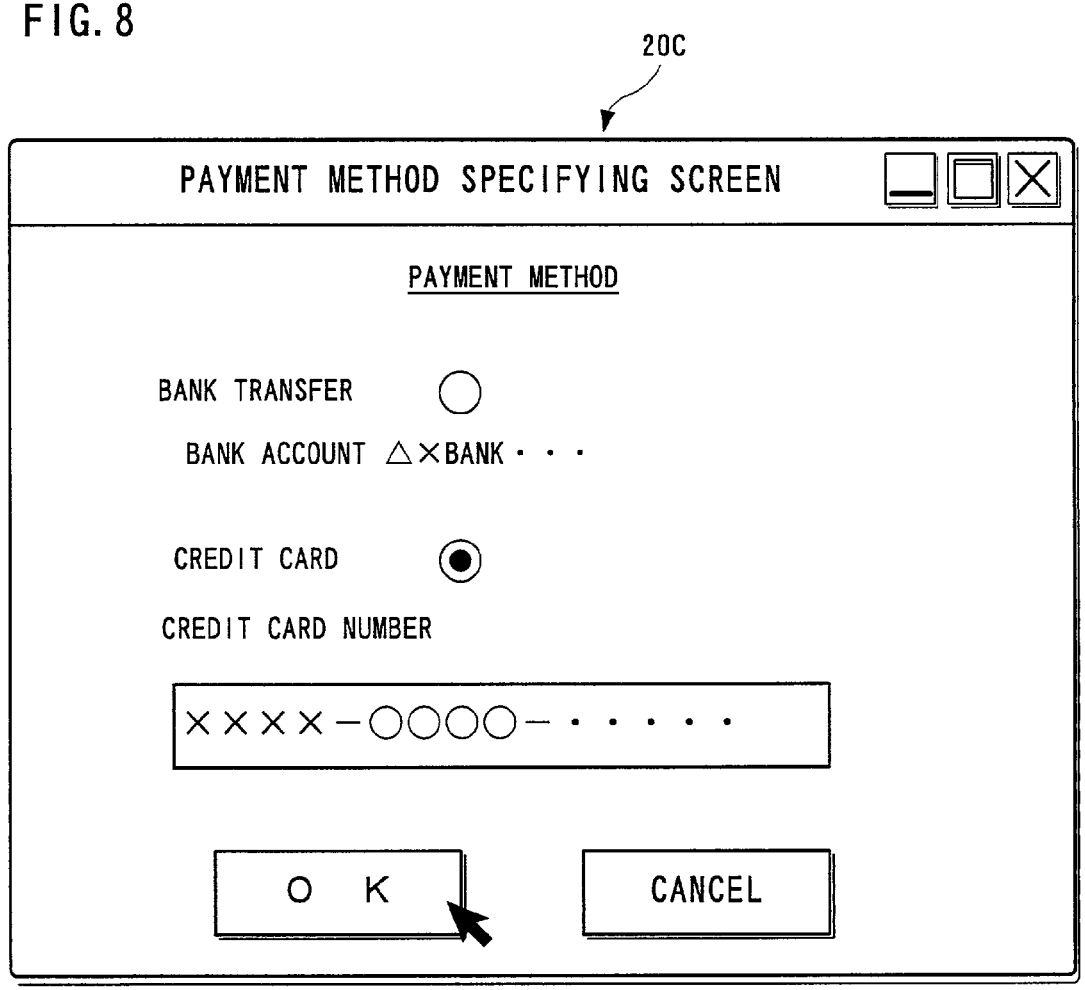
FIG. 8 is an illustrative view showing one example of a payment method specifying screen in purchasing.

FIG. 8 is an illustrative view showing one example of a payment method specifying screen at a time of purchasing. After inputting the personal information shown in FIG. 7, a payment method specifying screen 20C shown in FIG. 8 is displayed. By utilizing the screen 20C, the user selects a payment method (e.g., selects any one of payment through a bank transfer or payment by credit card). In a case the payment by credit card is selected, an input of a credit card number is required. After determining the payment method, the button or the icon of "OK" indicative of completion of all the input or "Cancel" indicative cancellation of purchase is required to be selected.

Figure 9:
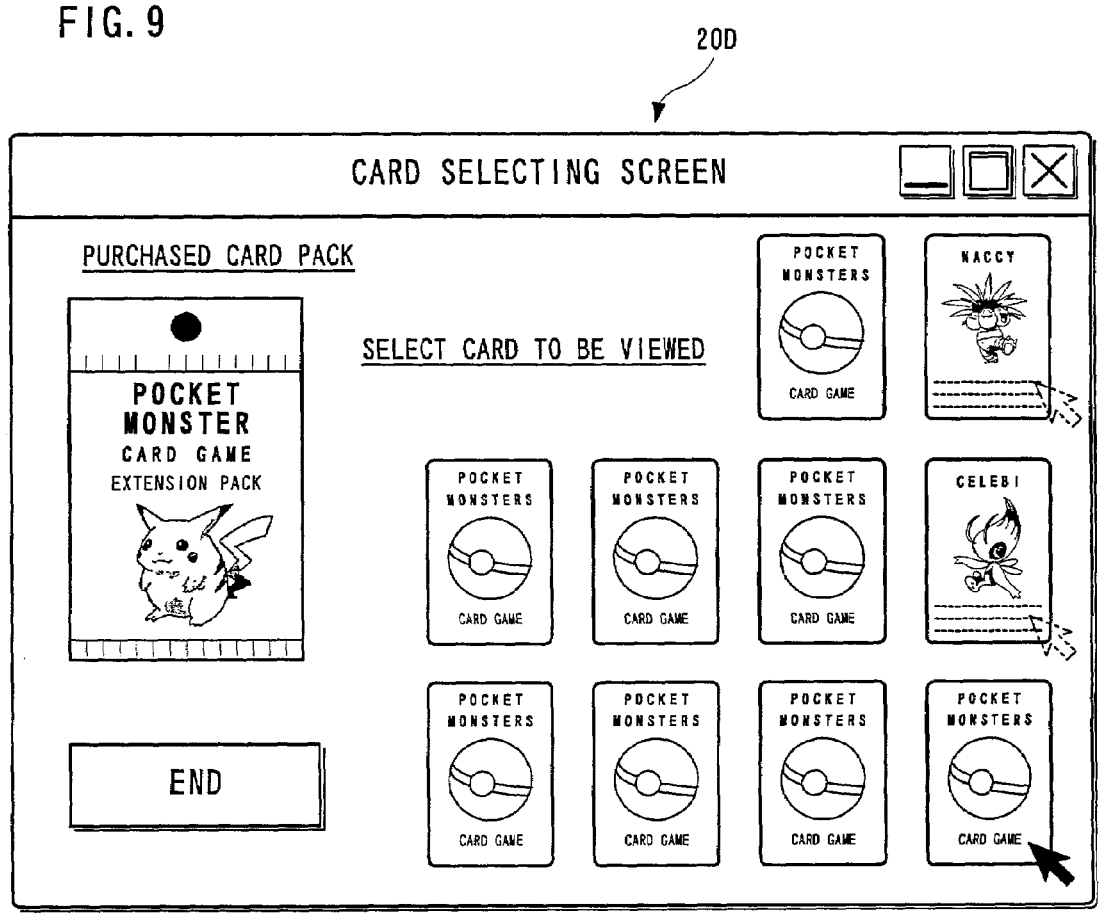
FIG. 9 is an illustrative view showing one example of a card selecting screen for showing contents of the card pack.

FIG. 9 is an illustrative view showing one example of the card selecting screen for showing the contents of the card pack. After the user specifies the payment method as shown in FIG. 8, a screen 20D for contents confirmation processing of the purchased cards (viewing the contents) is displayed. For example, an illustration of the package of the purchased expansion pack is displayed at the left part of the screen 20D. At the right of this, ten sheets of the trading cards enclosed in the expansion pack are displayed upside down. When the user puts the cursor at a card to be viewed so as to select the card, a front surface of the card is displayed on the same screen 20D, thereby to show the contents of the card.

It is noted that if all the cards are shown in this case, there is no enjoyment at a time of arrival of the item, and therefore, the number of sheets capable of being viewed may be limited such that only a part of the cards can be viewed.

Figure 10:
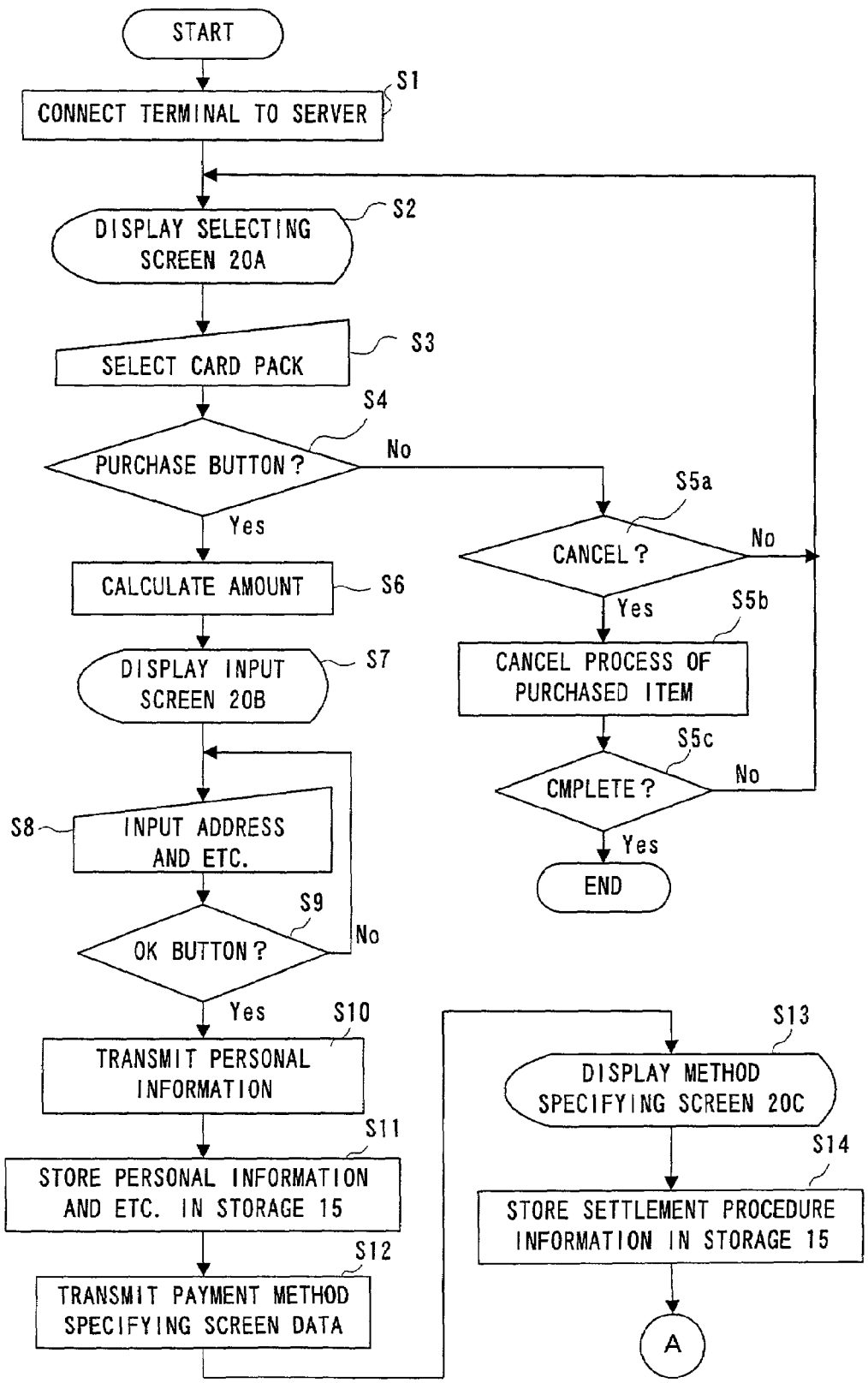
FIG. 10 is a flowchart showing a part of operation (from selection of the card pack to electronic account settlement processing) of this embodiment.

FIG. 10 and FIG. 11 are flowcharts for describing an operation of the electronic business transaction of the trading card according to one embodiment of the present invention. Herein, FIG. 10 shows a flowchart for an operation from a card pack selection to an electronic account settlement process, and FIG. 11 shows a flowchart showing operations of a card selection and a displaying the contents.

It is note that since the flowcharts shown in FIG. 10 and FIG. 11 chronologically shows operations of the MPU 11 of the server 10 and the CPU 21 of the terminal device 20 and an operation of the user so as to describe the operations at the server 10 side and the terminal 20 side in relation to each other; however, the server 10 and the terminal 20 are actually independently operated on the basis of the separate programs but cooperate with each other by transmitting/ receiving data with each other as necessary.

Next, referring to FIG. 2 to FIG. 11, a detailed operation of the electronic business transaction of the trading card will be described along the flowcharts of FIG. 10 and FIG. 11.

In a step S1, when the user inputs an address of a site for the electronic business transaction of the trading card by operating the input portion (keyboard) 24, the CPU 21 connects the terminal device 20 to the server 10 via the communication controller 22 and the Internet 30. The MPU 11 of the server 10 transmits data of the card pack selecting screen 20A shown in FIG. 6 to the terminal device 20 on the basis of a program stored in the storage 13 in a step S2. In response thereto, the CPU 21 displays the card pack selecting screen 20A on the display portion 25. The user selects a desired item on the screen 20A in a step S3. Thereafter, it is determined by the CPU 21 whether a purchase button is depressed (a purchase icon is clicked) or not. Where the purchase button is not depressed, it is determined whether or not a cancellation button is depressed in a step S5a. Where cancellation is not selected, the process returns to the step S2 and waits until purchase is determined. Then, where the cancellation is selected, cancellation processing of the purchased item is performed in a step S5b and then, it is determined whether or not an end button is depressed in a step 5c. Where an end button is not depressed, the process returns to the step S2 and waits a selection of another item. Where the end button is depressed, a connection is disconnected, and then, the electronic business transaction processing is terminated.

On the other hand, when the purchase is determined, it is determined so in a step S4, and the CPU 21 transmits to the server 10 information indicative of the purchased item and a determination of the purchase. Then, the process proceeds to a step S6. In the step S6, a total amount for payment (cost) is calculated on the basis of a quantity and a unit price of the item to be purchased. In a step S7, data for displaying the personal information input screen 20B shown in FIG. 7 is transmitted from the MPU 11 to the terminal device 20. In the step S7, the CPU 21 temporally stores the personal information input screen 20B in the storage 23 and displays it on the display portion 25. In a step S8, the user visually confirms the desired item and the estimated amount displayed on the screen 20B and inputs the personal information such as a name, an address (e-mail address as necessary) and etc. by operating the keyboard 24. In a following step S9, it is determined whether or not the "OK" button indicative of completion of an input of the personal information is depressed, and if it is not depressed, the process returns to the step S8 and waits until it is depressed. Then, when it is determined the "OK" button is depressed in a step S10, purchased item information (an item code and a quantity, and etc.) and personal information (a name and an address, and etc.) as well as a code indicative of completion of an input of the personal information are transmitted from the CPU 21 to the server 10. In a step S11, the MPU 11 saves or registers the received purchased item information and the personal information in the storage area for storing the purchase item information and the personal information of the user in the storage 15.

In a following step S12, the MPU 11 transmits to the terminal device 20 data for displaying a payment method specifying screen (or settlement procedure specifying screen) 20C shown in FIG. 8 on the basis of the main program. Responsively, the MPU 11 displays the payment method specifying screen 20C on the display portion 25 in a step S13. In a step 14 the user selects any one of pay through a bank transfer and pay by credit card (or pay on delivery by mail or parcel delivery service is available) as a payment method on the screen 20C, and where the pay by credit card is selected, a credit card number is input and then, the OK button is depressed. Thus, information related to the payment method or the settlement procedure thus input is transmitted from the CPU 21 to the server 10 in the step S14, and saved or registered in the storage area for storing the settlement procedure information of the customer in the storage 15 by the MPU 11.

After the payment method is specified, (or after purchase of the card pack is determined), the MPU 11 determines the kind of the card pack (card pack kind number) on the basis of the random number data stored in the storage area 14c. Herein, a determination method of the card pack is as follows. Assuming that random numbers 0 to 99 are generated, and a numeral (1 to 3) of the number (No. 1 to No. 3) of the expansion pack selected by the user is regarded as a hundred's digit, by combining the numeral with a two-digit numeral (tens and ones) determined by the random number data, one kind of card pack is determined out of three hundreds kinds of combinations. Then, the MPU 11 reads out the card number (card kind specifying data) of ten sheets of cards enclosed in the card pack determined by the kind of the card pack from the storage area 14a, and reads out image data (any data from G1 to Gn) of each card corresponding to the card number from the storage area 14b so as to transmit the data to the terminal device 20. At the same time, the MPU 11 writes the kind number of the card pack to a card pack contents data storage area of the storage 15 in correspondence to the customer.

The CPU 21 displays on the display portion 25 a card selecting screen 20D shown in FIG. 9 transmitted from the server 10 in the step S15. The user selects a card that he or she wants to see while viewing the card selecting screen 20D in a step S17. It is determined whether or not the card is selected in a step S18. If it is determined the card is selected, the image data corresponding to the selected card number is read out in a step S19, and the card image with a front surface is displayed at the display position of the selected card. In a step S20, the CPU 20 determines whether or not the end button is depressed (the end icon is selected), and if the end button is not depressed, the process returns to the step S17, and the operation from the step S17 to the step S20 is repeated.

Thus, there are advantages that the user can know the kind of the card enclosed in the card pack almost at the same time with the determination of the purchase by the electronic business transaction before the purchased trading card or card pack is delivered, and a desire to soon confirm the contents by the user can be realized.

It is noted that in a case the cards the user can view is limited in number, a quantity counter (or a quantity register) is provided, and the program is set such that a counted value of the quantity counter is advanced by one, and if the counted value of the quantity counter reaches the limitation number, viewing the contents of the card thereafter is limited. Therefore, there is an advantage that the user can confirm the kind (contents) of part of cards enclosed in the card pack purchased by the user at a time of determining the purchase while the user can look forward to waiting the kind of the card which has not viewed until delivery.

Furthermore, a program of a mini game (simple game to be played in short time) is provided and may be controlled so that the number of cards capable of being viewed is different depending on the result of the mini game. Thus, since the number of the cards the kind of which can be confirmed is changed depending on the result of the mini game, there are advantages that it is possible to enjoy the mini game looking forward to knowing large and small of the number of cards the kind of which can be confirmed, and therefore, a desire to purchase the card by the user utilizing the electronic business transaction can be more uplifted.

In the above described step S21, when it is determined the end button is depressed, the connection between the terminal device 20 and the server 10 is disconnected. Thereafter, in a step S22, the card pack selecting and shipping device 41 in the card factory 40 selects a kind of card pack corresponding to the card pack number purchased by each user on the basis of sales data of every user stored in the storage 15, prints the name and the address of the user on the envelope (or a seal printed with the address and the name is attached to the envelope or the package), encloses the selected card pack and a voucher in the envelope and etc., and then, seals it. Thus, the envelope enclosing the card pack is delivered to the user by mail or carrier such as a parcel delivery service and etc. receiving a shipping request.

It is noted that a dispatch process may be manually processed.

However, although cases in which a card pack changed in combination of the kind of the enclosed cards is provided in multiplicity kinds, and the kind of the card pack is determined in accordance with the random number data on the basis of the first combination method are described in the above-described embodiment, the combination of the card may be determined on the basis of the second combination method so as to increase the kind of the combination, and the card pack may be sold by the electronic business transaction.

In a case of the second combination method, 10 sheets of random data may be generated, and 10 sheets of kinds of card may be determined by one as described in parenthesis in above-described step S15. At this time, in a case that the probability of appearance is too high, the random number data is generated again irrespective of the generated random number data and is processed to become another card number such that the probability of appearance every card number or every character is approximate to the probability of appearance stored in the storage area 14b. Furthermore, the card number list is stored every rareness, and the card number may be selected at times equal to the number set in the card number list for each rareness such that the probability of appearance for each rareness in one pack becomes equal to the number stored in the storage area 14c for each rareness. The 10 sheets of card kind data (card number data) thus determined is written in the card number storage area of the storage 15 so as to be registered. Then, in the above described step S22, the automatic card combining and packaging device 43 in the card factory 40' automatically selects cards to be enclosed in one card pack on the basis of the card number registered in the card number storage area of the storage 15 and encloses the cards in the package and seals the package. Thereafter, the shipping device 42 encloses the card pack in the envelope written with the address and then, performs a shipping process.

Thus, there are advantages that the combination of the kind of cards enclosed in the card pack can be multiple in kinds, the card pack having a made-to-order combination is sold by the electronic business transaction, sales of the card pack having a combination of cards which is not sold by a counter selling at a store can be realized, and sales of the trading card by the electronic business transaction can be more promoted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic business transaction system of a trading card for selling, by an electronic business transaction utilizing a computer, a card pack in which a plurality of kinds of trading cards are substantially randomly selected and enclosed, wherein said card pack is sold with a seal so that contents of said trading cards cannot be viewed from outside said system, comprising:
   a purchase determination screen display generator for displaying a screen to select purchase of said card pack so as to allow a user to make a decision to purchase a card pack;
   a personal information input display generator for displaying a screen to specify personal information of the user so as to allow the user to input the personal information;
   a payment method specifying display generator for displaying a screen to specify a payment method of a cost by the user specified by said personal information input display generator so as to allow the user to specify the payment method;
   a contents confirmation selecting display generator for displaying a screen for confirming contents of said card pack so as to allow the user to select confirmation of the contents after personal information is input by said personal Information input display generator and the payment method is specified by said payment method specifying screen display generator, thereby completing purchase of said card pack; and
   a contents display generator for displaying at least part of the contents of said trading cards enclosed in said card pack purchased by the user when confirmation of the contents of said card pack is selected.

2. A system according to claim 1, wherein said purchase determination screen display generator includes a card pack kind determination means for substantially randomly determining any one of multiple kinds of card packs.

3. A system according to claim 2, wherein said card pack kind determination means includes a random number data generation means, and any one of said multiple kinds of card packs is determined on the basis of random number data generated by said random number data generation means.

4. A system according to claim 1, wherein said card pack kind determination means includes a random number data generation means, and kinds of cards to be enclosed in said card pack are determined by a predetermined number on the basis of random number data generated by said random data generation means.

5. A system according to claim 1, wherein said contents display generator displays the contents of all kinds of trading cards enclosed in said card pack.

6. A system according to claim 1, wherein said contents display generator displays as contents display of a trading card of the kind enclosed in said card pack image data baying the same figure as that of said trading card.

7. A system according to claim 1, further comprising a shipping process means for performing a shipping process on the kind of said card pack determined by said card pack kind determination means to an address of the personal information specified by said personal information input display generator.

8. An electronic business transaction method of a trading card for selling, by an electronic business transaction utilizing a computer, a card pack in which a plurality of kinds of trading cards are substantially randomly selected and enclosed, wherein said card pack is sold with a seal so that contents of said trading cards cannot be viewed from outside, said method comprising the steps of:
displaying a screen to select purchase of said card pack so as to allow an user to make a decision to purchase said card pack;
displaying a screen to specify personal information of the user so as to allow the user to input the personal information;
displaying a screen to specify a payment method by the user specified so as to allow the user to input the payment method;
displaying a screen for confirming contents of said card pack so as to allow the user to select confirmation of the contents after the personal information is input and the payment method of the cost is specified, thereby completing purchase of said card pack; and
displaying the contents of at least a part of said trading cards enclosed in said card pack purchased by the user when the confirmation of the contents of said card pack is selected.

9. A method according to claim 8, wherein the step of displaying a screen to select purchase of said card pack includes a card pack kind determining step for substantially randomly determining any one of said multiple kinds of card packs.

10. A method according to claim 9, wherein said card pack kind determining step determines any one of said multiple kinds of card packs by generating random number data.

11. A method according to claim 9, wherein said card pack kind determining step includes a random number data generation means, and the kinds of cards to be enclosed in said card pack are determined by a predetermined number on the basis of random number data generated by said random data generation means.

12. A method according to claim 8, further comprising performing a shipping process on the kind of said card pack determined by said card pack kind determination step to an address of the personal information specified.

13. A method according to claim 8, wherein the step of displaying the contents displays the contents of all kinds of trading cards.

14. A method according to claim 8, wherein the step of displaying the contents displays as a contents display of a trading card of the kind enclosed in said card pack image data having the same figure as that of said trading card.

15. An electronic business transaction system of a trading card for selling, on a web page opened on a server, a card pack in which a plurality of kinds of trading cards are substantially randomly selected,
wherein said card pack is sold with a seal so that contents of said trading cards cannot be viewed from outside and are multiple in kinds depending on a combination of the kind of the enclosed trading cards,
said electronic business transaction system is formed by said server including a host computer, a user terminal including a terminal computer selectively connected to said server, a connecting medium connecting said server and at least one of said user terminals,
said host computer transmits/receives data required for purchase of said card pack by the user between said user terminal when said user terminal is connected,
said user terminal, when connected to said host computer,
displays a purchase selecting screen for allowing the user to select purchase of said card pack, and transmits purchase determination data to said server when the user makes a decision to purchase said card pack,
displays a screen for specifying personal information so as to allow the user to specify the personal information, and transmits individual specifying information to said server when the individual specifying information is input,
displays a screen to allow the user to specify a payment method of a cost of said card pack, and transmits the payment method data to said server when the payment method is specified,
displays a screen for confirming contents of said card pack so as to select confirmation of the contents after the individual specifying information is input and the payment method of the cost is specified thereby completing purchase of said card pack,
displays at least the contents of a part of the trading cards enclosed in said purchased card pack when the confirmation of the contents of said card pack is selected,
said host computer further processes data required for an electronic business transaction transmitted from said terminal computer so as to perform electronic account settlement.

16. A system according to claim 15, wherein
said server further includes a first transmission data storage for storing transmission data, a first reception data storage for storing reception data, and a first transmitting/receiving means,
said user terminal further includes a second reception data storage for receiving reception data, a second transmission data storage for storing transmission data, and a second transmitting/receiving means,
said first transmission data storage stares respective data of said purchase selecting screen, a screen for specifying said personal information, a screen for specifying said payment method, a screen for confirming the contents, and a screen for displaying the contents of said trading card, and sequentially transmits each screen display data in response to a transmission command from said terminal computer via said first transmitting/receiving means,
said second transmitting/receiving means receives each screen display data transmitted from said first transmitting/receiving means, and writes each screen display data into said second reception data storage, said terminal computer sequentially processes each screen display data stored in said second reception data storage so as to be displayed on the screen, and sequentially transmits the input or selected purchase determination data, the individual specifying information, the payment method data, and the contents confirmation data to said host computer via said second transmitting/receiving means, said host computer stores the purchase determination data, the individual specifying information, the payment method data, and the contents confirmation data received by said first transmitting/receiving means in said first reception data storage each dine they are received so as to be subjected to a corresponding process.

17. A system according to claim 15, wherein said server further includes a first reception data storage for storing reception data and a first transmitting/receiving means, said user terminal further includes a second transmission data storage for storing transmission data and a second transmitting/receiving means, any one of said server and said user terminal includes a program storage for storing program data for an electronic business transaction, said program storage stores respective data of said purchase selecting screen, a screen for specifying the personal information, a screen for specifying the payment method, a screen for confirming the contents, and a screen for displaying the contents of said trading cards, said terminal computer sequentially processes each screen display data stored in said program so as to be displayed on the screen, and sequentially transmits the input or selected purchase determination data, the individual specifying information, the payment method data, the contents confirmation data to said host computer via said second transmitting/receiving means, said host computer stores the purchase determination data, the individual specifying information, the payment method data, and the contents confirmation data received by said first transmitting/receiving means in said first reception data storage each time they are received so as to be subjected to a corresponding process on the received data.

18. A system according to claim 15, wherein said purchase selecting screen includes a card pack kind determination means for substantially randomly determining any one of said multiple kinds of card packs.

19. A system according to claim 18, wherein said card pack kind determination means determines any one of said multiple kinds of card packs by generating random number data.

20. A system according to claim 18, wherein said card pack kind determining means includes a random number data generation means, and the kinds of cards to be enclosed in said card pack are determined by a predetermined number on the basis of random number data generated by said random number data generation means.

21. A system according to claim 15, further comprising a shipping process means for performing a shipping process on said card pack of the kind determined by said card pack kind determination means to an address of the personal information specified by said personal information input means.

22. A system according to claim 15, wherein said user terminal when confirmation of the contents of said card pack is selected, displays the contents of all kinds of trading cards enclosed in said purchased card pack.

23. A system according to claim 15, wherein said user terminal displays as a contents display of a trading card of the kind enclosed in said card packs, image data having the same figure as that of said trading card.

24. A server for an electronic business transaction system selling, by an electronic business transaction utilizing a computer, a card pack in which a plurality of kinds of trading cards are substantially randomly selected and enclosed comprising:

a purchase determination screen display generator for displaying on said user terminal a screen to select purchase of said card pack so as to allow the user to make a decision to purchase said card pack;

a personal information input display generator for displaying on said user terminal a screen to specify personal information of an user so as to allow the user to input the personal information;

a payment method specifying display generator for displaying on said user terminal a screen to specify a payment method of a cost by the user specified by said personal information input display execution so as to allow the user to specify the payment method;

a contents confirmation selecting display generator for displaying on said user terminal a screen to confirm contents of said card pack so as to allow the user to select to confirm the contents after the personal information is input by said personal information input display generator and the payment method of the cost is specified by said payment method specifying screen display generator, thereby completing purchase of said card pack; and a contents display generator for displaying on said user terminal contents of at least a part of said trading cards enclosed in said card pack purchased by the user when confirmation of the contents of said curd pack is selected on said user terminal.

* * * * *